(12) United States Patent
Santini

(10) Patent No.: US 10,875,358 B1
(45) Date of Patent: Dec. 29, 2020

(54) HIGH LOAD PIVOTING CASTER WITH INTEGRAL JACK

(71) Applicant: Patrick J. Santini, West Bend, WI (US)

(72) Inventor: Patrick J. Santini, West Bend, WI (US)

( * ) Notice: Subject to any disclaimer, the term of this patent is extended or adjusted under 35 U.S.C. 154(b) by 53 days.

(21) Appl. No.: 16/393,992

(22) Filed: Apr. 25, 2019

(51) Int. Cl.
*B60B 33/00* (2006.01)
*B60B 33/04* (2006.01)
(Continued)

(52) U.S. Cl.
CPC .......... *B60B 33/04* (2013.01); *B60B 33/0015* (2013.01); *B60B 33/0028* (2013.01); *B60B 33/0042* (2013.01); *B60B 33/0049* (2013.01); *B60B 33/0068* (2013.01); *B60B 33/02* (2013.01); *B60S 9/02* (2013.01); *B60B 33/0057* (2013.01); *B60B 33/0073* (2013.01);
(Continued)

(58) Field of Classification Search
CPC . Y10T 16/195; Y10T 16/196; B60B 33/0078; B60B 33/0086; B60B 33/02; B60B 33/021; B60B 33/023; B60B 33/025; B60B 33/0042; B60B 2301/046; B60B 2301/0463; B60B 2301/0465; B60B 2301/0467; B60B 33/04; B60B 33/0015; B60B 33/0028; B60B 33/0049; B60B 33/0068; B60B 33/0057; B60B 33/0073; B60B 2380/14; B60B 2380/50; B60B 2900/711; A61G 2007/0528; B60S 9/02; B60S 9/04; B60S 9/10
See application file for complete search history.

(56) References Cited

U.S. PATENT DOCUMENTS 1,809,609 A * 6/1931 Turner .................... B60B 33/02
16/21
2,369,453 A * 2/1945 Goldfield ............. A61B 6/4429
378/198
(Continued)

FOREIGN PATENT DOCUMENTS

JP         05116502 A  *  5/1993
JP      2010012910 A  *  1/2010
WO  WO-2007049364 A1  *  5/2007  ......... B60B 33/0073

OTHER PUBLICATIONS

"ModTruss INC Modular Building Components", Jan. 25, 2018, WWW.ModTruss.com, 6 pages. (Year: 2018).*

*Primary Examiner* — Chuck Y Mah
(74) *Attorney, Agent, or Firm* — Donald J. Ersler

(57) ABSTRACT

A high load pivoting caster with integral jack preferably includes a wheel mounting base, a pair of wheels, a high load jack, a slewing ring, an wheel axle and an attachment cube. The wheel mounting base includes a base plate, and first and second pairs of wheel support plates. The first wheel is retained between the first pair of wheel support plates. The second wheel is retained between the second pair of wheel support plates. The wheel axle is inserted through the pair of wheels and the first and second pair of wheel support plates. The slewing ring preferably includes a stator ring, a rotor ring, an indexing plate and a set of rotary bearings. An opening is formed through the indexing plate to receive an outer perimeter of the high load jack. The attachment cube is preferably attached to a top of the indexing plate with welding.

17 Claims, 4 Drawing Sheets

(51) Int. Cl.
*B60B 33/02* (2006.01)
*B60S 9/02* (2006.01)
*B60S 9/10* (2006.01)
*B60S 9/04* (2006.01)

(52) U.S. Cl.
CPC ....... *B60B 2380/14* (2013.01); *B60B 2380/50* (2013.01); *B60B 2900/711* (2013.01); *B60S 9/04* (2013.01); *B60S 9/10* (2013.01)

(56) References Cited

U.S. PATENT DOCUMENTS

| | | | | |
|---|---|---|---|---|
| 2,422,892 A * | 6/1947 | Forbes | B60B 33/02 | 16/35 R |
| 2,541,514 A * | 2/1951 | Herold | B60B 33/0042 | 295/8.5 |
| 2,828,578 A * | 4/1958 | McCabe | B60B 33/0089 | 248/188.4 |
| 3,026,558 A * | 3/1962 | Mulholland | B60B 33/0042 | 16/44 |
| 4,028,773 A * | 6/1977 | Morgan | B60B 33/02 | 16/35 R |
| 4,105,218 A * | 8/1978 | Newell | B62B 5/0083 | 280/43.12 |
| 4,205,413 A * | 6/1980 | Collignon | B60B 33/021 | 16/35 D |
| 4,336,629 A * | 6/1982 | Jarvis, Jr. | B60B 33/0078 | 16/35 R |
| 4,349,937 A * | 9/1982 | Fontana | B60B 33/0078 | 16/35 R |
| 4,349,938 A * | 9/1982 | Fontana | B60B 33/0078 | 16/35 R |
| 4,364,148 A | 12/1982 | McVicker | | |
| 4,494,271 A * | 1/1985 | Perlin | B60B 33/0002 | 16/18 A |
| 4,777,697 A * | 10/1988 | Berndt | B60B 33/0002 | 16/21 |
| 4,918,783 A * | 4/1990 | Chu | B60B 33/04 | 16/19 |
| 5,042,110 A * | 8/1991 | Orii | B60B 33/0042 | 16/32 |
| 5,461,753 A * | 10/1995 | Rounds | F16C 19/10 | 16/21 |
| 6,055,704 A | 5/2000 | Leibman | | |
| 6,604,258 B2 * | 8/2003 | Saggio | B60B 33/0018 | 16/42 R |
| 6,871,380 B2 * | 3/2005 | Chen | B60B 1/006 | 16/19 |
| 6,899,345 B1 * | 5/2005 | Bearden | A01D 34/74 | 16/19 |
| 8,136,201 B2 * | 3/2012 | Yantis | B60B 33/04 | 16/32 |
| 9,051,965 B1 * | 6/2015 | Spektor | B60B 33/006 | |
| 9,056,524 B2 * | 6/2015 | Lee | B60B 33/0047 | |
| 9,215,924 B2 * | 12/2015 | Seefeldt | A47B 37/00 | |
| 10,272,719 B2 * | 4/2019 | Asai | B60B 9/06 | |
| 10,688,826 B2 * | 6/2020 | Hall | B60B 33/063 | |
| 2002/0174512 A1 * | 11/2002 | Sorensen | B60B 33/0002 | 16/18 R |
| 2007/0089265 A1 * | 4/2007 | Lin | B60B 33/0039 | 16/35 R |
| 2007/0277350 A1 | 12/2007 | Hines | | |
| 2010/0247281 A1 * | 9/2010 | Kempf | B60B 33/0049 | 414/800 |
| 2011/0131761 A1 * | 6/2011 | Campbell | B60B 33/045 | 16/35 D |
| 2011/0232027 A1 | 9/2011 | Block et al. | | |
| 2015/0174977 A1 * | 6/2015 | Shahroodi | B60D 1/665 | 280/476.1 |
| 2015/0306908 A1 * | 10/2015 | Sharratt | B60B 33/0028 | 16/45 |

\* cited by examiner

HIGH LOAD PIVOTING CASTER WITH INTEGRAL JACK

BACKGROUND OF THE INVENTION

1. Field of the Invention

The present invention relates generally to wheels and more specifically to a high load pivoting caster with integral jack, which utilizes a slewing ring to provide a capacity of at least two tons.

2. Discussion of the Prior Art

U.S. Pat. No. 4,364,148 to McVicker discloses a combination castor and jack means apparatus. U.S. Pat. No. 6,055,704 to Leibman discloses a caster with built-in adjustment. Patent publication no. 2007/0277350 to Hines discloses a leveling caster system and method of using same. Patent publication no. 2011/0232027 to Block et al. discloses a swivel caster. However, none of the above prior art casters utilizes a slewing ring to provide a load capacity of at least two tons.

Accordingly, there is a clearly felt need in the art for a high load pivoting caster with integral jack, which utilizes a slewing ring to provide a load capacity of at least two tons.

SUMMARY OF THE INVENTION

The present invention provides a high load pivoting caster with integral jack, which utilizes a slewing ring to provide a capacity of at least two tons. The high load pivoting caster with integral jack (high load pivoting caster) preferably includes a wheel mounting base, a pair of wheels, a high load jack, a slewing ring, an wheel axle and an attachment cube. The wheel mounting base includes a base plate, a first pair of wheel support plates, a second pair of wheel support plates and a plurality of cross members. The wheel mounting base includes a front pivot lock hole and a rear pivot lock hole. The first pair of wheel support plates extend downward from a first end of the base plate. A first axle hole is formed through a front of the first pair of wheel support plates to receive the wheel axle. The first wheel is retained between the first pair of wheel support plates. A first cross member is preferably attached to a rear of the first pair of wheel support plates. The second pair of wheel support plates extend downward from a second end of the base plate. A second axle hole is formed through a front of the second pair of wheel support plates to receive the wheel axle. The second wheel is retained between the second pair of wheel support plates. A second cross member is preferably attached to a rear of the second pair of wheel support plates. A front cross member is preferably attached between a front of the first and second pair of wheel support plates. A rear cross member is preferably attached between a rear of the first and second pair of wheel support plates. The wheel axle is inserted through the pair of wheels and the first and second axle holes. The wheel axle is preferably axially retained relative to the first and second pairs of wheel support plates with a pair of roll pins inserted through each end of the wheel axle.

The slewing ring preferably includes a stator ring, a rotor ring, an indexing plate and a set of rotary bearings. The stator ring is preferably attached to a top of the base plate with a plurality of fasteners. The indexing plate includes a first indexing hole and a second indexing hole spaced 90 degrees from the first indexing hole. The indexing plate is attached to a top of the rotor ring with a plurality of fasteners. The stator ring and the rotor ring each include a bearing groove to receive the set of roller bearings. The high load jack is preferably a high load trailer jack, but other types of jacks may also be used. The high load jack may be actuated by manual cranking with a crank arm; automatically by driving the crank arm with a hydraulic motor, pneumatic motor or a shaft powered transmission; or automatically with a hydraulic cylinder. An opening is formed through the indexing plate to receive an outer perimeter of the high load jack. The high load jack is preferably attached to the indexing plate by welding the outer perimeter of the high load jack to the indexing plate.

The attachment cube is preferably attached to a top of the indexing plate with welding. An access opening is formed through four sides and a top of the attachment cube. A plurality of fastener holes are formed through the four sides and the top of the attachment cube. The plurality of fastener holes are provided to facilitate attachment of ModTruss® tubular beams and other accessories with fasteners.

Accordingly, there is a clearly felt need in the art for a high load pivoting caster, which utilizes a slewing ring to provide a load capacity of at least two tons.

These and additional objects, advantages, features and benefits of the present invention will become apparent from the following specification.

DETAILED DESCRIPTION OF THE PREFERRED EMBODIMENTS

Figure 1:
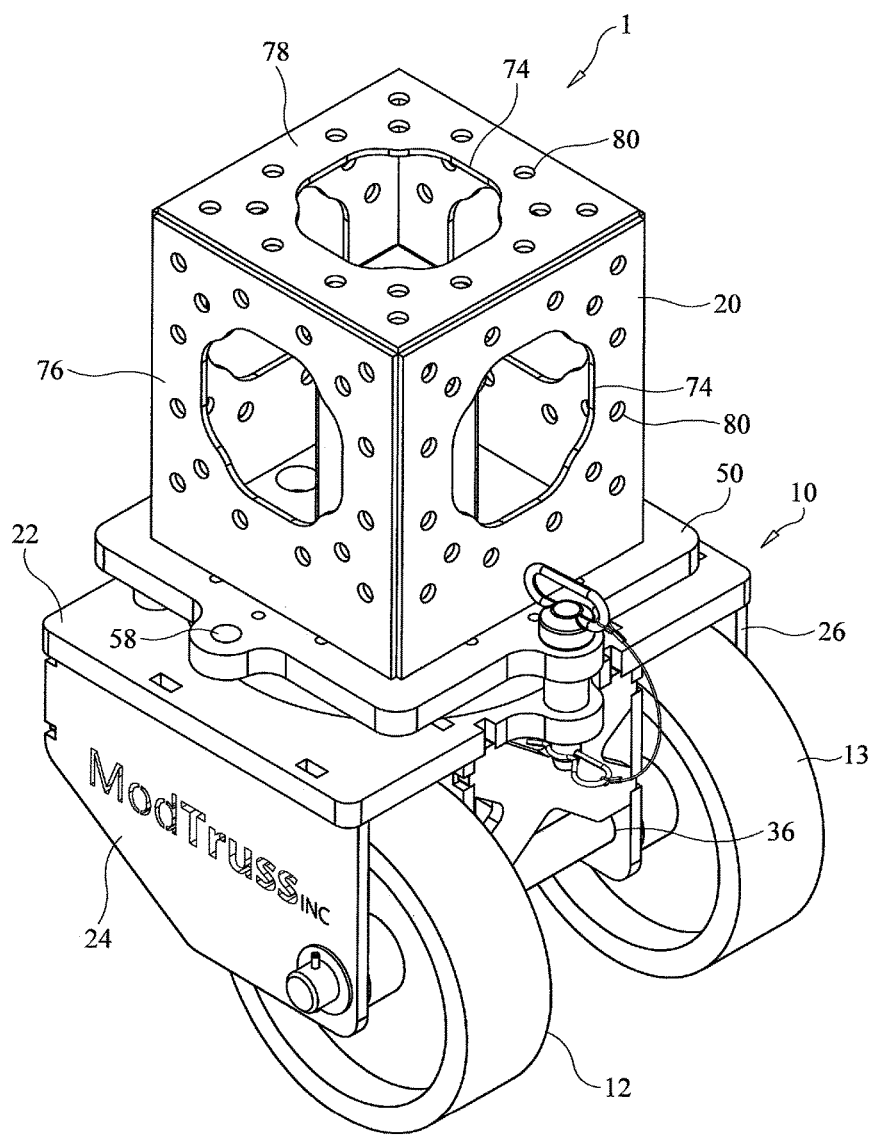
FIG. 1 is a perspective view of a high load pivoting caster in accordance with the present invention.
Figure 2:
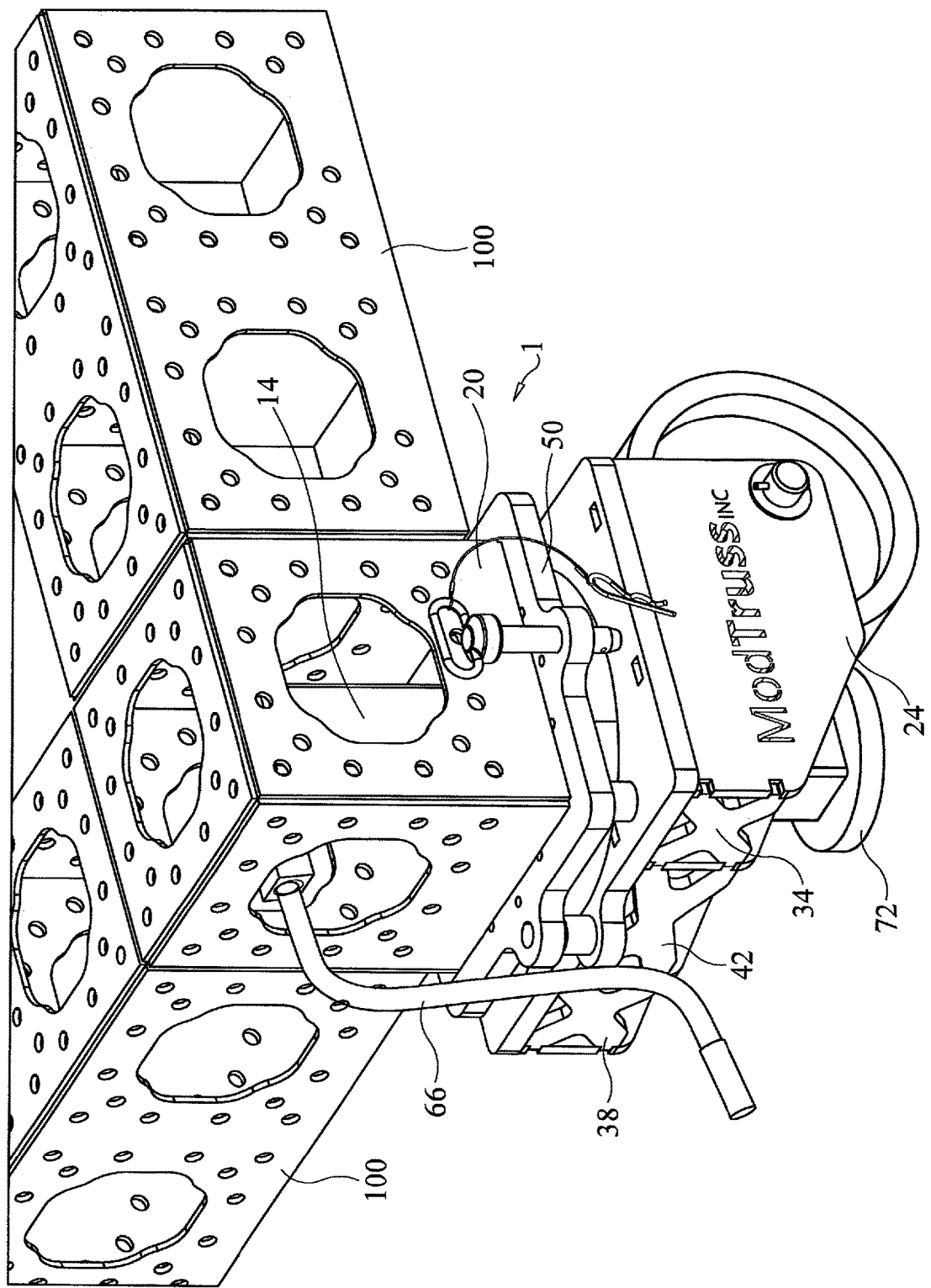
FIG. 2 is a perspective view of a high load pivoting caster used in a support structure in accordance with the present invention.
Figure 3:
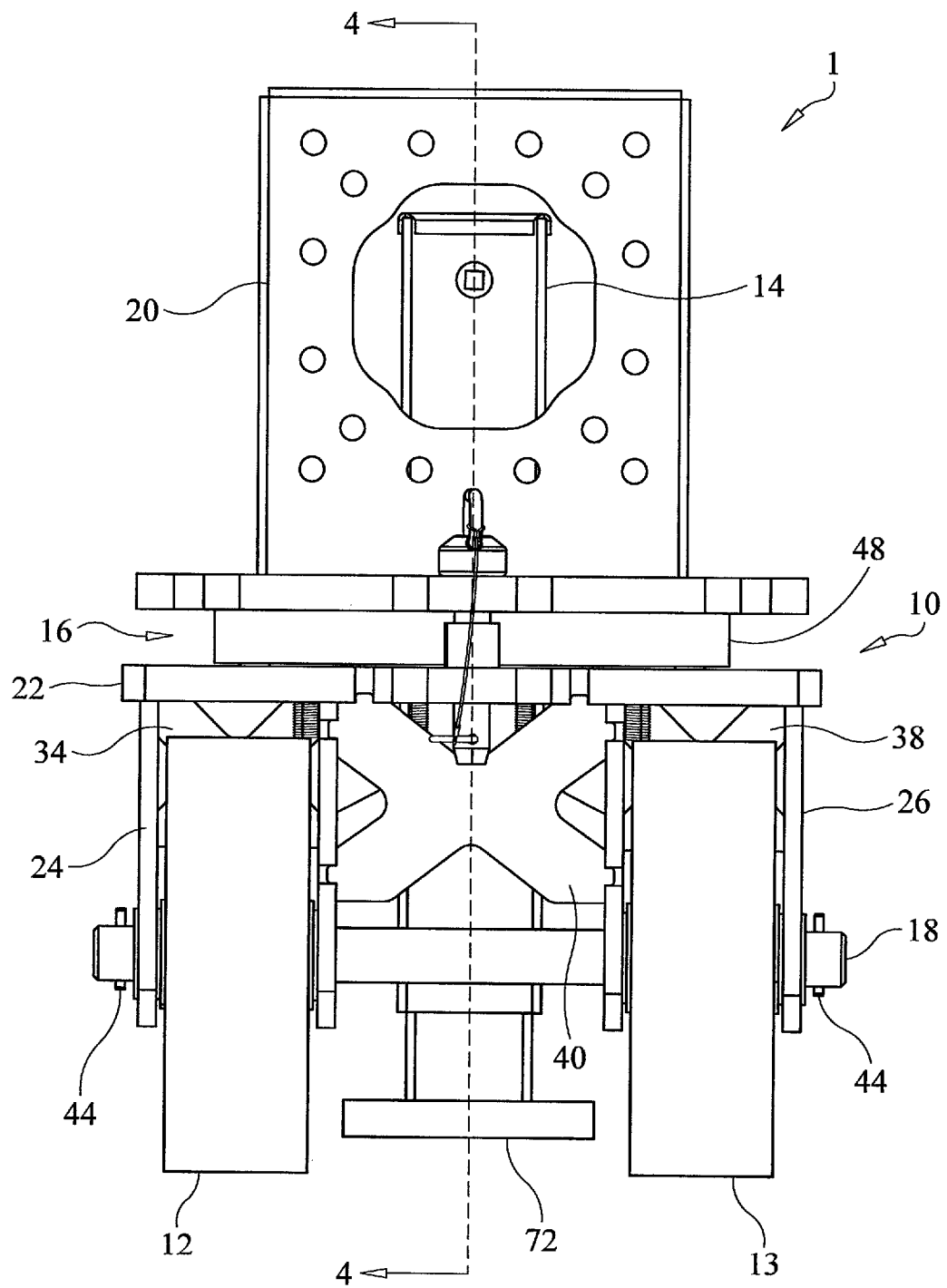
FIG. 3 is a front view of a high load pivoting caster in accordance with the present invention.
Figure 4:
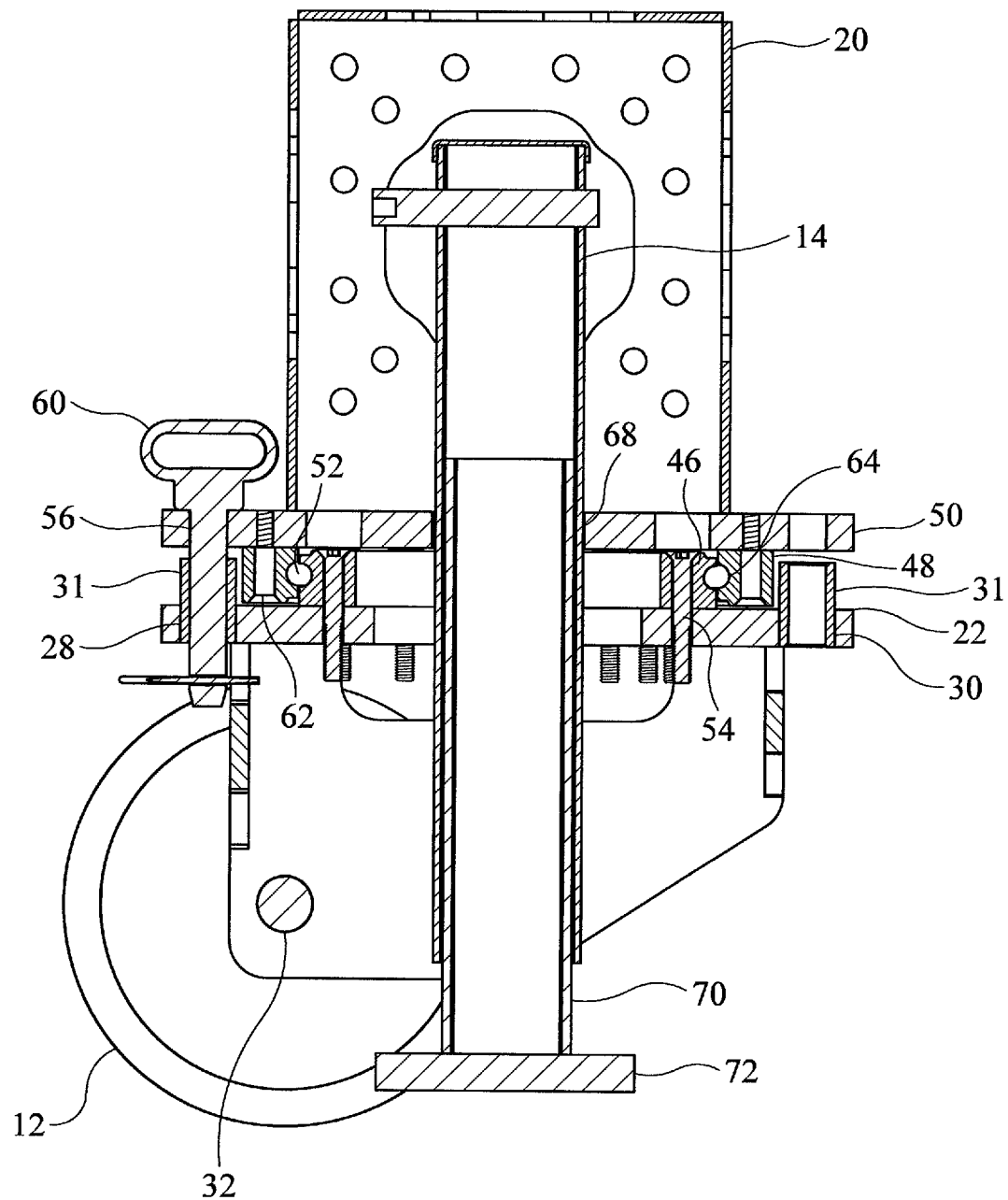
FIG. 4 is a cross sectional view of a high load pivoting caster cut through FIG. 3 in accordance with the present invention.

With reference now to the drawings, and particularly to FIG. 1, there is shown a perspective view of a high load pivoting caster 1. With reference to FIGS. 2-4, the high load pivoting caster 1 preferably includes a wheel mounting base 10, a pair of wheels 12,13, a high load jack 14, a slewing ring 16, an wheel axle 18 and an attachment cube 20. The wheel mounting base 10 includes a base plate 22, a first pair of wheel support plates 24, a second pair of wheel support plates 26 and a plurality of cross members. The base plate 22 includes a front pivot lock hole 28 and a rear pivot lock hole 30. Bushings 31 are preferably pressed into the front and rear pivot lock holes 28, 30. The first pair of wheel support plates 24 extend downward from a first end of the base plate 22. A first axle hole 32 is formed through a front of the first pair of wheel support plates 24 to receive the wheel axle 18. The first wheel 12 is retained between the first pair of wheel support plates 24. A first cross member 34 is preferably attached to a rear of the first pair of wheel support plates 24. The second pair of wheel support plates 26 extend downward from a second end of the base plate 22. A second axle hole 36 is formed through a front of the second pair of wheel support plates 26 to receive the wheel axle 18. The second wheel 13 is retained between the second pair of wheel support plates 26. A second cross member 38 is preferably attached to a rear of the second pair of wheel support plates 26. A front cross member 40 is preferably attached between a front of the first and second pair of wheel support plates 24, 26. A rear cross member 42 is preferably attached between a rear of the first and second pair of wheel support plates 24, 26. The wheel axle 18 is inserted through the pair of wheels 12, 13 and the first and second axle holes 32, 36. The wheel axle 18 is preferably axially retained relative to the first and second pair of wheel support plates 24, 26 with a pair of roll pins 44 inserted through each end of the wheel axle 18.

The slewing ring 16 preferably includes a stator ring 46, an rotor ring 48, an indexing plate 50 and a set of rotary bearings 52. The stator ring 46 is preferably attached to a top of the base plate 22 with a plurality of fasteners 54. The indexing plate 50 includes a first indexing hole 56 and a second indexing hole 58 spaced 90 degrees from each other. An indexing pin 60 is inserted through the first or second indexing hole 56, 58 into the front or rear bushings 31. The indexing plate 50 is attached to a top of the rotor ring 48 with a plurality of fasteners 62. The stator ring 46 and the rotor ring 48 each include a bearing groove 64 to receive the set of roller bearings 52. The high load jack 14 is preferably a high load trailer jack, but other types of jacks may also be used. The high load jack 14 may be actuated by manual cranking with a crank arm 66 arm; automatically by driving the crank arm with a hydraulic motor, pneumatic motor or a shaft powered transmission; or automatically with a hydraulic cylinder. A jack opening 68 is formed through the indexing plate 50 to receive an outer perimeter of the high load jack 14. The high load jack 14 is preferably attached to the indexing plate 50 by welding the outer perimeter of the high load jack 14 to the indexing plate 50. The high load jack 14 includes an actuation member 70 and a foot 72 attached to a bottom of the actuation member 70. The high load jack 14 is capable of elevating the high load pivoting caster 1, such that the first and second wheels 12, 13 do not touch a support surface.

The attachment cube 20 is preferably attached to a top of the indexing plate 50 with welding. An access opening 74 is formed through four sides 76 and a top 78 of the attachment cube 20. A plurality of fastener holes 80 are formed through the four sides 76 and the top 78 of the attachment cube 20. The plurality of fastener holes 80 are provided to facilitate attachment of ModTruss® tubular beams 100 and other accessories with fasteners.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A high load pivoting caster comprising:
   a wheel mounting base includes two outer wheel support plates, two inner wheel support plates and at least one cross member, said two outer wheel support plates and said two inner wheel support plates extend from a bottom of said wheel mounting base, said at least one cross member is engaged with said two inner wheel support plates;
   a first wheel is rotatably engaged with a first one of said two outer wheel support plates and said two inner wheel support plates, a second wheel is rotatably engaged with a second one of said two outer wheel support plates and said two inner wheel support plates; and
   a slewing ring includes a stator ring, a rotor ring, an indexing plate and a set of rotary bearings, said stator ring is attached to said wheel mounting base, said stator ring is rotatably retained relative to said rotor ring with said set of rotary bearings, said rotor ring is attached to said indexing plate.

2. The high load pivoting caster of claim 1 wherein:
   said wheel mounting base includes a front pivot lock hole and a rear pivot lock hole, said indexing plate includes a first indexing hole and a second indexing hole, located 90 degrees apart from said first indexing hole.

3. The high load pivoting caster of claim 2, further comprising:
   an indexing pin is sized to be received by said front and rear pivot lock holes and said first and second indexing holes.

4. The high load pivoting caster of claim 1, further comprising:
   a wheel axle is rotatably retained in a front of said two inner and outer wheel support plates to support said first and second wheels.

5. The high load pivoting caster of claim 1, further comprising:
   said at least one cross member includes a first cross member and a second cross member, said first cross member engages said two inner wheel support plates at a front of said two inner wheel support plates, said second cross member engages said two inner wheel support plates at a rear of said two inner wheel support plates.

6. A high load pivoting caster comprising:
   a wheel mounting base includes at least two wheel support plates, said at least two wheel support plates extend from a bottom of said wheel mounting base;
   a pair of wheels are rotatably engaged with said at least two wheel support plates, respectively;
   a slewing ring includes a stator ring, a rotor ring, an indexing plate and a set of rotary bearings, said stator ring is attached to said wheel mounting base, said stator ring is rotatably retained relative to said rotor ring with said set of rotary bearings, said rotor ring is attached to said indexing plate; and
   said wheel mounting base includes a front pivot lock hole and a rear pivot lock hole, said indexing plate includes a first indexing hole and a second indexing hole, located 90 degrees apart from said first indexing hole.

7. The high load pivoting caster of claim 6, further comprising:
   an indexing pin is sized to be received by said front and rear pivot lock holes and said first and second indexing holes.

8. The high load pivoting caster of claim 6 wherein:
   said at least two wheel support plates include a first pair of wheel support plates and a second pair of wheel support plates.

9. The high load pivoting caster of claim 8, further comprising:
   a wheel axle is rotatably retained in a front of said first and second pair of wheel support plates to support said pair of wheels.

10. The high load pivoting caster of claim 8, further comprising:
    a first cross member is retained in a rear of said first pair of wheel support plates, a second cross member is retained in a rear of said second pair of wheel support plates.

11. The high load pivoting caster of claim 8, further comprising:
- a front cross member is retained between a front of said first and second wheel support plates, a rear cross member is retained between a rear of said first and second pair of wheel support plates.

12. The high load pivoting caster of claim 6, further comprising:
- an attachment cube is attached to a top of said indexing plate, said attachment cube includes a plurality of access openings and a plurality of fastener holes.

13. A high load pivoting caster comprising:
- a wheel mounting base includes two outer wheel support plates and two inner wheel support plates, said two outer wheel support plates and said two inner wheel support plates extend from a bottom of said wheel mounting base;
- a first wheel is rotatably engaged with a first one of said two outer wheel support plates and said two inner wheel support plates, a second wheel is rotatably engaged with a second one of said two outer wheel support plates and said two inner wheel support plates;
- a slewing ring includes a stator ring, a rotor ring, an indexing plate and a set of rotary bearings, said stator ring is attached to said wheel mounting base, said stator ring is rotatably retained relative to said rotor ring with said set of rotary bearings, said rotor ring is attached to said indexing plate; and
- a high load jack is retained in said indexing plate, said high load jack is located between said first and second inner support plates.

14. The high load pivoting caster of claim 13 wherein:
said wheel mounting base include a front pivot lock hole and a rear pivot lock hole, said indexing plate includes a first indexing hole and a second indexing hole, located 90 degrees apart from said first indexing hole.

15. The high load pivoting caster of claim 14, further comprising:
- an indexing pin is sized to be received by said front and rear pivot lock holes and said first and second indexing holes.

16. The high load pivoting caster of claim 13, further comprising:
- a wheel axle is rotatably retained in a front of said two outer and inner wheel support plates to support said wheels.

17. The high load pivoting caster of claim 13 wherein:
said high loading pivoting caster has a load capacity of at least two tons.

* * * * *